United States Patent [19]

Tamura

[11] 4,229,989
[45] Oct. 28, 1980

[54] V-BELT TYPE AUTOMATICALLY VARIABLE TRANSMISSION

[75] Inventor: Jyoji Tamura, Iwata, Japan

[73] Assignee: Yamaha Hatsudoki Kabushiki Kaisha, Iwata, Japan

[21] Appl. No.: 964,253

[22] Filed: Nov. 28, 1978

[30] Foreign Application Priority Data

Nov. 29, 1977 [JP] Japan .................................. 52-143101

[51] Int. Cl.³ .......................................... F16H 55/52
[52] U.S. Cl. ........................................................ 474/12
[58] Field of Search ............... 74/230.17 E, 230.17 M, 74/230.17 R, 230.17 D

[56] References Cited

U.S. PATENT DOCUMENTS

| | | | |
|---|---|---|---|
| 2,173,661 | 9/1939 | Perrine | 74/230.17 M |
| 2,529,743 | 11/1950 | Salsbury et al. | 74/230.17 E |
| 2,543,337 | 2/1951 | Salsbury | 74/230.17 E X |
| 2,556,512 | 6/1951 | Ammon | 74/230.17 M |
| 3,597,987 | 8/1971 | Kiekhaefer | 74/230.17 E |
| 3,616,706 | 11/1971 | Shimamoto | 74/230.17 M |
| 3,727,476 | 4/1973 | Heidorn | 74/230.17 M X |
| 3,733,918 | 5/1973 | Domaas | 74/230.17 E |
| 3,759,111 | 9/1973 | Hoff | 74/230.17 E |
| 3,768,323 | 10/1973 | Houle | 74/230.17 E |
| 3,777,584 | 12/1973 | Domas | 74/230.17 E |
| 3,842,637 | 10/1974 | Wilson | 74/230.17 M |
| 3,868,862 | 3/1975 | Bessette | 74/230.17 M |
| 3,884,316 | 5/1975 | Bowers | 74/230.17 M |
| 3,968,702 | 7/1976 | Beaudoin et al. | 74/230.17 M X |
| 3,995,505 | 12/1976 | Luenberger | 74/230.17 E X |
| 3,996,811 | 12/1976 | Reese | 74/230.17 M X |
| 4,023,635 | 5/1977 | Teal | 74/230.17 M |
| 4,027,544 | 6/1977 | Kobayashi | 74/230.17 E |
| 4,095,479 | 6/1978 | Lundberg | 74/230.17 M X |

FOREIGN PATENT DOCUMENTS

| | | | |
|---|---|---|---|
| 981059 | 1/1976 | Canada | 74/230.17 R |
| 1001901 | 1/1957 | Fed. Rep. of Germany | 74/230.17 M |
| 1166388 | 6/1958 | France | 74/230.17 M |
| 187178 | 1/1964 | Sweden | 74/230.17 R |

OTHER PUBLICATIONS

"Lectures on Automobile Engineering No. 5, Two and Three Wheeled Automobiles, Scooters".

*Primary Examiner*—Leslie Braun
*Attorney, Agent, or Firm*—Fleit & Jacobson

[57] ABSTRACT

V-belt type variable transmission including primary and secondary sheave assemblies which are connected together by an endless V-belt, the primary sheave assembly having a centrifugal device for biasing it so that the effective diameter of the primary sheave assembly is increased in accordance with an increase in drive shaft. The secondary sheave assembly has a cam device for biasing it in a direction wherein the effective diameter thereof is increased under the force applied by the cam device. In addition, the secondary sheave assembly is provided with a centrifugal device which centrifugally biases it to assist the action of the cam device.

7 Claims, 6 Drawing Figures

V-BELT TYPE AUTOMATICALLY VARIABLE TRANSMISSION

The present invention relates to V-belt type variable transmissions and more particularly to torque responsive automatically variable V-belt type transmissions.

V-belt type variable transmissions are known as being able to provide an appropriate speed ratio in accordance with a torque load imposed thereon by means of a relatively simple mechanism and have been widely employed in driving systems of vehicles, particularly snow vehicles. Such transmissions generally include a primary sheave assembly adapted to be driven by a primemover such as an internal combustion engine, a secondary sheave assembly provided on a driven shaft and V-belt means stretched between the sheave assemblies. The primary sheave assembly has centrifugal weight means which rotates with the drive shaft to produce a centrifugal force acting in the direction of increasing the effective diameter of the sheave assembly. In other words, the centrifugal force of the weight means serves to bias the movable sheave of the primary sheave assembly toward the stationary sheave. Further, the primary sheave assembly has spring means which functions to bias the movable sheave away from the stationary sheave so the effective diameter of the sheave assembly is decreased. The secondary sheave assembly has a torque cam device which functions to bias the movable sheave of the secondary sheave assembly toward the stationary sheave so that the effective diameter of the sheave assembly is increased in response to an increase in the torque load on the driven shaft.

In the aforementioned type of torque responsive automatically variable V-belt transmissions, inconveniences have been experienced in that an engine brake effect cannot well be utilized under a high speed operation and that a quick response cannot be provided in acceleration just succeeding to deceleration. More specifically, in the aforementioned mechanism, there is a tendency that the bias force applied from the torque cam device is significantly decreased under a condition wherein the power is being transmitted in the reverse direction, that is, from the driven shaft to the secondary sheave assembly so that the effective diameter of the secondary sheave assembly is excessively decreased under this condition.

Another disadvantage of the conventional V-belt type automatically variable transmissions is that it is difficult to control the driving torque during the start of the vehicle. During the start of the vehicle, the transmission is in a position wherein the speed ratio is large or in other words the effective diameter of the secondary sheave is large so that a relatively large torque is applied to the driven shaft. Under the condition, the torque cam device functions to enhance the tendency further. Thus, the driving torque from the engine is amplified by the transmission and transmitted through the driven shaft and a road engaging device such as wheels or endless tracks to the road surface. However, when the driving power is increased excessively beyond the frictional force between the road engaging device and the road surface, slip may be produced between the road engaging device and the road surface giving an adverse effect on the acceleration of the vehicle.

It has therefore been proposed to provide means for producing a slip between the V-belt and the secondary sheave assembly so that the driving effort on the driven shaft is not increased to an extent in which slip may be produced in the road engaging areas. For example, it has been proposed to use a dual slope cam configuration in the torque cam device so that the bias force of the cam device is smaller in the starting period of the vehicle than in normal condition. It should be noted, however, that the low speed slope of the dual slope cam is supposed to be used not only in the starting period of the vehicle but also in acceleration succeeding to deceleration in normal operation. In view of this fact and further the fact that a smooth operation of cam follower must be ensured across the cam slopes, it is practically impossible to provide a substantial difference between the cam slopes.

It is therefore an object of the present invention to provide a V-belt type automatically variable transmission in which the aforementioned problems are eliminated.

Another object of the present invention is to provide a V-belt type variable transmission in which vehicle starting torque can be effectively suppressed without having any adverse effect on the acceleration property.

A further object of the present invention is to provide a V-belt type variable transmission which can prevent any decrease in engine brake effect.

The present invention is therefore characterized by the fact that the secondary sheave assembly is provided in addition to the torque cam device as adopted in the conventional transmission with centrifugal weight means which is rotated together with the driven shaft for producing a centrifugal force to bias the secondary sheave assembly in the direction wherein the effective diameter is increased.

According to the present invention, the force for biasing the secondary sheave assembly in the direction of increasing the effective diameter is thus applied by the torque cam device and the centrifugal weight means so that there will be no significant decrease in the biasing force even when the load on the driven shaft is suddenly decreased. Thus, it is possible to prevent any decrease of the engine brake effect. Further, even when the vehicle is suddenly decelerated by closing the engine throttle valve under a high speed operation, the secondary sheave assembly is maintained in a position wherein it possesses an adequately large effective diameter so that reacceleration can be performed with an adequate sensitivity. It should further be noted that since the bias force on the secondary sheave assembly is applied by the torque cam device and the centrifugal weight means, the bias force by the torque cam device can be small as compared with that in the conventional arrangement so that it is possible to suppress the driving effort as applied to the driven shaft during the vehicle starting period. It is possible to determine the bias force by the torque cam device comparatively freely taking into account the relationship with the centrifugal weight means. Thus, the conventionally adopted dual slope cam configuration may be substituted by a single slope cam configuration.

According to a preferable aspect of the present invention, the centrifugal weight means is comprised of two arms which are connected together at their ends, one of the arms being mounted at the other end on the driven shaft against axial movement with respect thereto and the other arm being attached to the movable sheave. The centrifugal weight means can be housed completely in a space defined by the movable and stationary sheaves.

The above and other objects and features of the present invention will become apparent from the following descriptions of a preferred embodiment taking reference to the accompanying drawings, in which.

Figure 1:
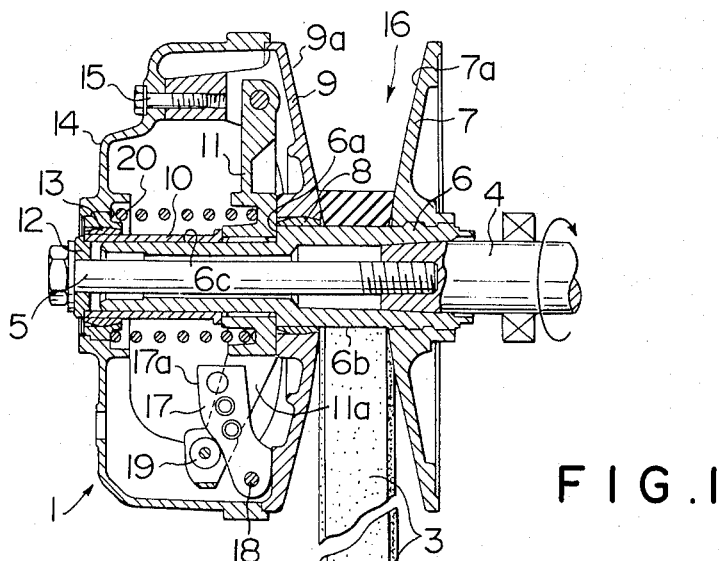
FIG. 1 is a sectional view of a V-belt type variable transmission in accordance with one embodiment of the present invention.

Referring to the drawings, particularly to FIG. 1, the V-belt type automatically variable transmission shown therein comprises a primary sheave assembly 1, a secondary sheave assembly 2 and a V-belt stretched between the sheave assemblies 1 and 2. The primary sheave assembly 1 includes a main shaft 6 which is connected with an engine output shaft 4 by means of a bolt 5. A stationary sheave 7 is secured to the shaft 6 at an end of the shaft adjacent to the engine output shaft 4. The shaft 6 is formed with a large diameter cylindrical portion 6b and a small diameter cylindrical portion 6c with a shoulder 6a formed therebetween. On the large diameter portion 6b, there is mounted a movable sheave 9 through a bearing 8 for axial slidable movement.

A sleeve 10 is mounted on the small diameter portion 6c of the shaft 6 and secured in position by the aforementioned bolt 5 with a cam follower carrier 11 interposed between the sleeve 10 and the shoulder 6a. The bolt 5 acts on the sleeve 10 through an end plate 12 which is located between the head of the bolt 5 and the outer end of the sleeve 10. The sleeve 10 carries a cover 14 which is axially slidably mounted thereon through a bearing 13 and secured to the movable sheave 9 by means of bolts 15.

As well known in the art, the sheaves 7 and 9 respectively have conical surfaces 7a and 9a which confront each other to define a peripheral groove of V-shaped configuration. The movable sheave 9 has one or more centrifugal weights 17 each of which is supported thereby through a pivot pin 18 in the space defined by the movable sheave 9 and the cover 14. The weight 17 is formed at a side with a cam surface 17a. The cam follower carrier 11 has radial arms 11a which correspond in number to the centrifugal weights 17. On the arm 11a, there is mounted a cam follower roller 19 for engagement with the cam surface 17a. The movable sheave 9 and the cover 14 are biased in left in the plane of FIG. 1 by means of a compression spring 20 which acts between the cover 14 and the cam follower carrier 11. It will therefore be understood that the movable sheave 9 is maintained in the extreme left position under the influence of the spring 20 as far as the speed of the engine output shaft 4 is low, however, the weight 17 is rotated about the pin 18 in response to an increase in the speed of the output shaft 4 to force the roller 19 toward left through the cam surface 17a to thereby create a reaction force which moves the sheave 9 toward right against the action of the spring 20 resulting in a decrease in the width of the groove 16.

The secondary sheave assembly 2 comprises a sleeve 22 secured to a driven shaft 21 by means of a bolt 23, and a stationary sheave 24 mounted on the sleeve 22 at one end thereof through a spline mechanism so that the sheave 24 is rotated together with the sleeve 22 and the driven shaft 21. On the other end of the sleeve 22, there is mounted a cam member 25 through a spline mechanism. The sleeve 22 further carries a movable sheave 26 which is mounted on the sleeve 22 through a bearing 27 for axial slidable movement.

Figure 2:
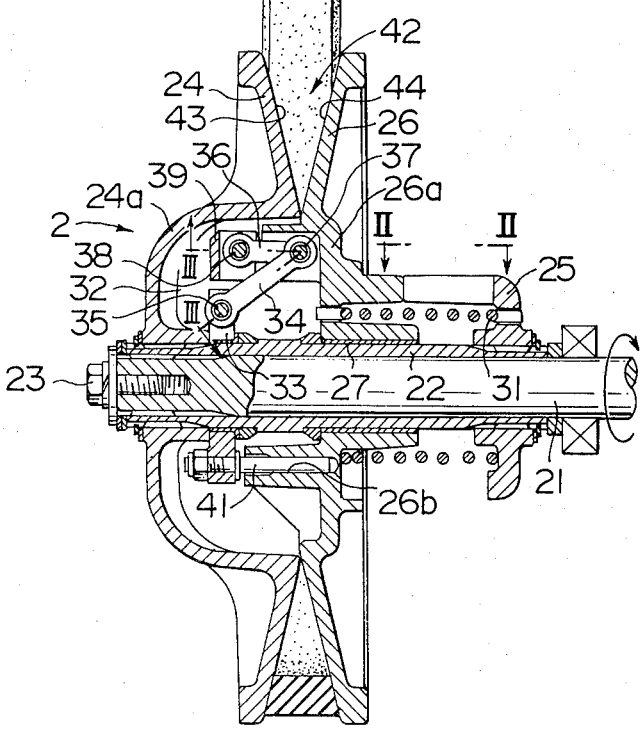
FIG. 2 is a view as seen along the line II—II in FIG. 1.
Figure 2:
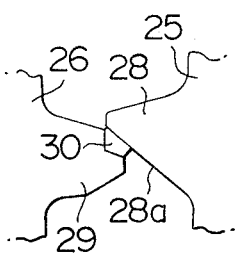
Figure 3:
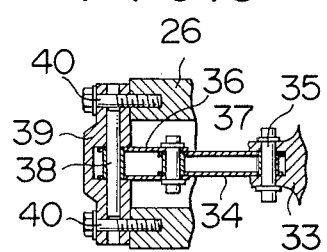
FIG. 3 is a sectional view taken along the line III—III in FIG. 1.

As shown in FIG. 2, the cam member 25 has a cam lobe 28 at a side adjacent to the movable sheave 26 and a cam surface 28a is formed at one side of the cam lobe 28. The movable sheave 26 has a projection 29 at a side facing to the cam member 28 and a shoe 30 is carried by the projection 29 for engagement with the cam surface 28a. A torsion spring 31 is disposed between the movable sheave 26 and the cam member 25 so as to force the shoe 30 into engagement with the cam surface 28a.

The stationary sheave 24 is formed at the center portion thereof with a bell shaped housing portion 24a which defines a space 32 with a center portion 26a of the movable sheave 26. In the space 32, there is a ring member 33 which is mounted on the sleeve 22 immovably in the axial direction and has one or more arms 34 pivotably mounted thereon at one of their ends by means of pins 35. The arm 34 is connected at the other end with one end of an arm 36 through a pin 37, the other end of the arm 36 being pivotably attached by means of a pin 38 to a bracket 39 which is in turn connected through bolts 40 with the movable sheave 26.

The ring member 33 has suitable number of axially extending guide pins 41 which are disposed about the shaft 21 at angularly equidistant positions. The guide pins 41 are slidably received in guide holes 26b formed in the movable sheave 26 so that the ring member 33 is rotated together with the movable sheave 26.

Figure 4:
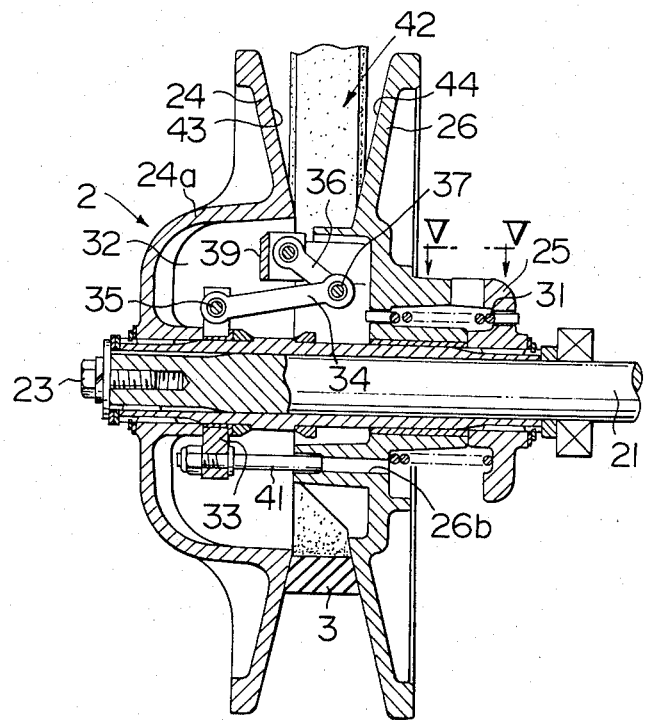
FIG. 4 is a sectional view of the secondary sheave assembly in the minimum effective diameter position.
Figure 5:
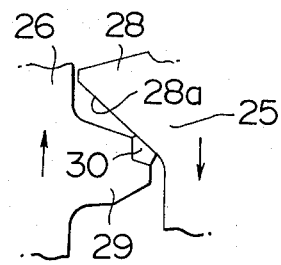
FIG. 5 shows a torque cam adopted in the secondary sheave assembly.
Figure 6:
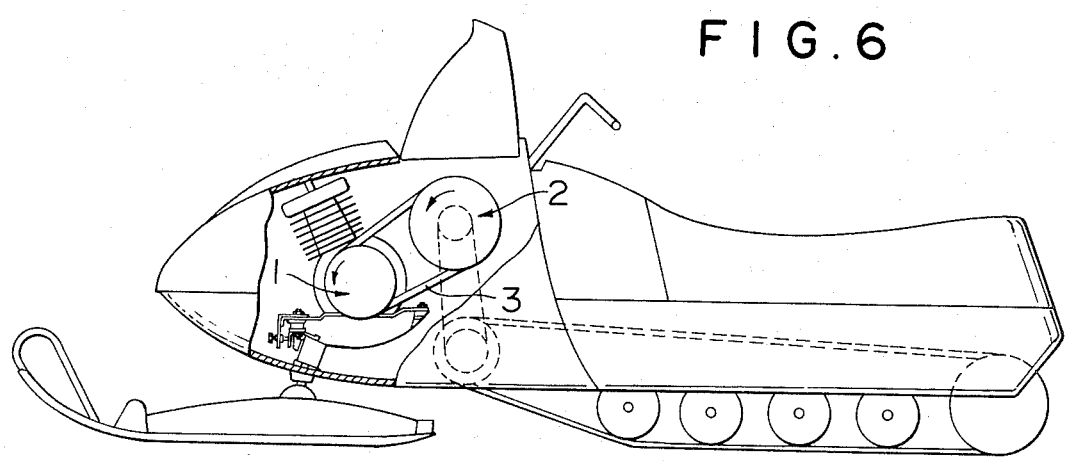
FIG. 6 shows a snow vehicle having the transmission in accordance with the present invention.

The stationary sheave 24 and the movable sheave 26 respectively have conical surfaces 43 and 44 which are confronted with each other to define a peripheral groove 42 of V-shaped cross-section. The V-belt 3 is passed through the V-shaped grooves 16 and 42 in the sheave assemblies 1 and 2. In FIGS. 4 and 5, there are shown the secondary sheave assembly 2 and the cam device therein with parts at the minimum speed ratio position. FIG. 6 shows a snow vehicle equipped with the transmission in accordance with the present invention.

In operation of the transmission, only a small centrifugal force is produced in the weight 17 under the idling operation of the engine wherein the speed of the output shaft 4 is small, so that the movable sheave 9 is forced under the influence of the spring 20 to the extreme left position as shown in FIG. 1. Thus, the power is not transmitted from the sheaves 7 and 9 to the V-belt 3 and a slip is produced between the sheaves and the V-belt. In this instance, the secondary sheave assembly 2 is in the position shown in FIG. 1 wherein the movable sheave 26 is forced under the action of the spring 31 and the cam surface 28a.

As the engine speed increases, the centrifugal weight 17 is swingably moved about the pin 18 to apply a leftward force to the cam follower roller 19 so that a reaction force is produced to move the sheave 9 toward right. Thus, the V-belt 3 is now caught between the sheaves 7 and 9, and therefore the rotation of the sheave assembly 1 is transmitted to the V-belt 3.

Referring to the secondary sheave assembly 2, the tension in the V-belt 3 functions to force the movable sheave 26 away from the stationary sheave 24 while an axial thrust is produced between the cam surface 28a and the shoe 30 to force the movable sheave 26 toward the stationary sheave 24 due to the driving torque applied to the driven shaft 21. Thus, the movable sheave 26 is maintained at a position wherein the tension in the V-belt 3 and the axial thrust from the cam surface 28a is balanced during the vehicle starting period.

As the rotation of the primary sheave assembly 1 is transmitted through the V-belt 3 to the secondary sheave assembly 2, the secondary sheave assembly 2 starts to rotate so that a centrifugal force is produced in the arms 34 and 36 and the pin 37 to force the movable sheave 26 toward the stationary sheave 24. Thus, the movable sheave 26 is maintained at a position wherein the sum of the axial thrust produced at the cam surface 28a and the centrifugal force of the arms 34 and 36 is balanced with the force produced by the tension of the V-belt 3. In this manner, the effective diameters of the primary and secondary sheaves are automatically determined in accordance with the torque load on the driven shaft 21 and the speed and torque of the engine output shaft 4.

According to the arrangement, the axial thrust as produced by the cam surface 28a during the vehicle starting period can be made smaller than in the conventional arrangement because the centrifugal force of the arms 34 and 36 is additionally applied to the axial force during normal operation. Thus, it is possible to restrict the contact pressure between the V-belt 3 and the sheaves at the vehicle starting period to thereby prevent any slip of the road engaging elements such as the caterpillars of the vehicle due to an excessive driving effort.

When the engine throttle valve is suddenly closed during a high speed operation of the vehicle, the driving torque is no longer transmitted from the output shaft 4 and the primary sheave assembly 1 to the secondary sheave assembly 2 but the vehicle continues to run under inertia. In this instance, there is sudden decrease in the axial thrust applied from the cam surface 28a to the movable sheave 26, however, since the driven shaft 21 still continues to rotate at high speed, the centrifugal force of the arms 34 and 36 and the pin 37 is maintained, whereby the effective diameter of the secondary sheave assembly 2 is prevented from being decreased. It is therefore possible to maintain a speed ratio which is sufficient to utilize the engine brake effort. Further, it is possible to obtain a satisfactorily sensitive response in acceleration.

When the transmission of the present invention is mounted on a snow vehicle, the driven shaft 21 is connected with a driven axle on the vehicle through a chain-sprocket mechanism having a certain speed reduction ratio.

The invention has thus been shown and described with reference to a specific embodiment, however, it should be noted that the invention is in no way limited to the details of the illustrated structures but changes and modifications may be made without departing from the scope of the appended claims.

I claim:

1. V-belt type automatically variable transmission comprising a primary sheave assembly having an effective diameter and mounted on a drive shaft adapted to be driven by a primemover, centrifugal means associated with the primary sheave assembly for biasing it so that the effective diameter is increased in accordance with an increase in rotating speed of the drive shaft, a secondary sheave assembly having an effective diameter and provided on a driven shaft, cam means associated with said secondary sheave assembly for biasing it so that the effective diameter is increased in accordance with an increase in torque load on the driven shaft, V-belt means stretched between the primary and secondary sheave assemblies for interconnecting the assemblies, second centrifugal means adapted to be rotated together with the driven shaft, said second centrifugal means being associated with said secondary sheave assembly so that it is centrifugally biased in a direction wherein the effective diameter of the secondary sheave assembly is increased.

2. V-belt type transmission in accordance with claim 1 in which said second centrifugal means associated with the secondary sheave assembly includes weight means comprised of a first arm pivotably mounted at one end without freedom of axial movement with respect to the driven shaft, and a second arm having one end pivotably mounted on a movable sheave element of the secondary sheave assembly and the other end pivotably connected with the other end of the first arm.

3. V-belt type transmission in accordance with claim 2 in which said secondary sheave assembly includes a movable sheave and a stationary sheave which cooperate with each other to define a belt groove, said first arm being pivotably mounted at said one end on a ring member which is in turn mounted axially immovably on the driven shaft, said ring member being rotatable together with the movable sheave of the secondary sheave assembly.

4. V-belt type transmission in accordance with claim 3 in which said ring member is connected with axially extending pin and hole connection.

5. V-belt type transmission in accordance with claim 1 in which said secondary sheave assembly includes a movable sheave and a stationary sheave which cooperate with each other to define a belt groove, said cam means being provided between the movable sheave and the driven shaft.

6. V-belt type transmission in accordance with claim 5 in which said cam means comprises a cam element provided on the driven shaft, a cam follower provided on the movable sheave, and spring means for maintaining engagement between the cam follower and the cam element.

7. V-belt type transmission in accordance with claim 1 in which said secondary sheave assembly includes a movable sheave and a stationary sheave which cooperate with each other to define a belt groove, a space being formed between the movable and stationary sheaves for housing said centrifugal means therein.

* * * * *